(12) United States Patent
Gao et al.

(10) Patent No.: US 10,088,846 B2
(45) Date of Patent: Oct. 2, 2018

(54) SYSTEM AND METHOD FOR INTENDED PASSENGER DETECTION

(71) Applicant: GM GLOBAL TECHNOLOGY OPERATIONS LLC, Detroit, MI (US)

(72) Inventors: Peter Gao, San Francisco, CA (US); Matthias Wisniowski, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/432,126

(22) Filed: Feb. 14, 2017

(65) Prior Publication Data

US 2017/0153714 A1 Jun. 1, 2017

Related U.S. Application Data

(60) Provisional application No. 62/302,889, filed on Mar. 3, 2016.

(51) Int. Cl.
| | |
|---|---|
| *G05D 1/00* | (2006.01) |
| *G06F 3/01* | (2006.01) |
| *G06K 9/00* | (2006.01) |
| *G06Q 10/04* | (2012.01) |
| *G01S 17/89* | (2006.01) |
| *G01C 21/34* | (2006.01) |
| *H04W 4/02* | (2018.01) |

(Continued)

(52) U.S. Cl.
CPC ........... *G05D 1/0088* (2013.01); *G01C 21/34* (2013.01); *G01S 17/89* (2013.01); *G06F 3/017* (2013.01); *G06K 9/00288* (2013.01); *G06K 9/00335* (2013.01); *G06K 9/00785* (2013.01); *G06K 9/00791* (2013.01); *G06K 9/00798* (2013.01); *G06K 9/00805* (2013.01); *G06K 9/2018* (2013.01); *G06Q 10/047* (2013.01); *G06T 19/006* (2013.01); *G08G 1/202* (2013.01); *H04W 4/02* (2013.01); *G06Q 10/00* (2013.01)

(58) Field of Classification Search
CPC ........ G05D 1/008; G01C 21/34; G01S 17/89; G06Q 10/047; G06F 3/017
See application file for complete search history.

(56) References Cited

U.S. PATENT DOCUMENTS

| | | | |
|---|---|---|---|
| 2016/0161266 A1* | 6/2016 | Crawford et al. ..... | G01C 21/34 701/25 |
| 2017/0249846 A1* | 8/2017 | Ignaczak et al. ....... | G01S 19/03 |

FOREIGN PATENT DOCUMENTS

| | | | | |
|---|---|---|---|---|
| DE | 102015007018 A1 * | 5/2016 | ............... | G08G 1/00 |
| SE | 1450716 A1 * | 12/2015 | ............... | G08G 1/00 |

OTHER PUBLICATIONS

Espacenet translation of DE 10 2015 007 018 A1 (10 pages) (Year: 2016).*

* cited by examiner

*Primary Examiner* — Dale W Hilgendorf
(74) *Attorney, Agent, or Firm* — Lorenz & Kopf, LLP (57) ABSTRACT

A system and method for locating and identifying a potential passenger by an autonomous vehicle includes: receiving a pickup request for the potential passenger, where the pickup request includes a geographic location for locating and picking up the potential passenger by the autonomous vehicle; locating the potential passenger based on the geographic location and using data from one or more sensors of the autonomous vehicle; and in response to locating the potential passenger, controlling the autonomous vehicle to a position to enable pickup of the potential passenger.

14 Claims, 3 Drawing Sheets

(51) Int. Cl.
 *G06T 19/00* (2011.01)
 *G08G 1/00* (2006.01)
 *G06K 9/20* (2006.01)
 *G06Q 10/00* (2012.01)

SYSTEM AND METHOD FOR INTENDED PASSENGER DETECTION

CROSS-REFERENCE TO RELATED APPLICATIONS

This application claims the benefit of U.S. Provisional Application Ser. No. 62/302,889, filed on 3 Mar. 2016, which is incorporated in its entirety by this reference.

TECHNICAL FIELD

This invention relates generally to the vehicle automation field, and more specifically to new and useful systems and methods for detecting an intended passenger of an autonomous vehicle.

BACKGROUND

Vehicle automation has been suggested as a means to increase vehicle safety almost as long as cars have been in existence—experiments on autonomy in cars have been conducted since at least the 1920s. Only recently, though, has computer technology advanced enough to make true vehicle automation possible.

In addition to improving safety while driving, autonomous vehicles have the opportunity to increase the utilization of vehicles; for example, by enabling multiple people to share rides taken with a single vehicle. To fully take advantage of this opportunity; however, autonomous vehicles must be able to accurately and quickly locate and identify passengers.

Thus, there is a need in the vehicle automation field to create and methods for detecting an intended passenger of an autonomous vehicle. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Overview

Much of the focus on autonomous vehicles surrounds the potential for such vehicles to greatly reduce the number of serious injuries and the like occurring due to traffic accidents, and deservedly so. This effect is one that benefits not only autonomous vehicle passengers, but also entire communities.

While increasing driving safety is of paramount importance, the ability of autonomous vehicles to contribute to the enrichment of communities is not limited to this area. In particular, autonomous vehicles have the opportunity to change how we think of car ownership—when vehicles can conceivably be used safely without the presence of the vehicle's owner or a trusted driver, the possibility for sharing utilization of that vehicle with others becomes substantially more appealing.

Whether vehicles are used as part of a widespread ridesharing platform or are simply shared between a few individuals, the ability of autonomous vehicles to quickly and effectively locate and identify passengers for pickup is of paramount importance to a smooth riding and/or driving experience. Presently, it may be difficult for an autonomous vehicle operating within a ridesharing platform or the like to locate and identify an intended passenger for several reasons. Namely, while existing GPS technologies allow an autonomous vehicle to locate a passenger based on an address location and/or possibly, even a spot location on a map, existing GPS lack the high level of precision and granularity required to pinpoint an exact geographic location of an intended passenger.

Further, while some ridesharing applications include a photo of an intended passenger that can be referenced by a driver of a vehicle operating on an associated ridesharing platform, some autonomous vehicles do not have the capability to identify intended passengers using a photo having a facial image of an intended passenger or the like. Thus, other than tracking an intended passenger's mobile computing device (e.g., smart phone) via a ridesharing application, an autonomous vehicle may not include means for identifying an intended passenger without express identification input from the intended passenger and/or for potentially authenticating the passenger.

The inability of an autonomous vehicle to geographically locate an intended passenger with high precision and accuracy and also, the inability of the autonomous vehicle to specifically identify and/or recognize the intended passenger increases the overall time that it takes the autonomous vehicle to satisfy a ride request. Specifically, in a city having a critical mass of ridesharing vehicles including autonomous vehicles and other vehicles, a typical rider or passenger can expect that, from the time a request for a ride has been submitted to the time that the ridesharing vehicle has performed a pickup, a ride request can take up to 15-20 minutes to satisfy, in some instances. This time for pickup needs to be reduced significantly. Notwithstanding other factors, such as traffic, a major reason for these types of passenger pickup delays include the ridesharing vehicle's inability to locate the intended passenger and even if the ridesharing vehicle has come into a close vicinity of the intended passenger, the ridesharing vehicle may still be unable to specifically identify the intended passenger for a successful and timely pickup.

Additionally, in the instances that the ride request or pickup request by an intended passenger is not made via a rideshare platform or is implied via a gesture or signaling (e.g., hailing for pickup) by the intended passenger, existing autonomous vehicles may not be able to comprehend the gesture or signaling by the intended passenger as an indirect pickup request or indirect ride request (e.g., a ride request made without a ridesharing application).

Accordingly, the embodiments of the present application are directed to systems and methods for detecting an intended passenger of an autonomous vehicle. These systems and methods may increase the ability for autonomous vehicles to be utilized effectively across communities and reduce a time that it takes the autonomous vehicle to process a request for a ride and successfully pick up the intended passenger who is the subject of or initiated the ride request.

1. System for Intended Passenger Detection

Figure 1:
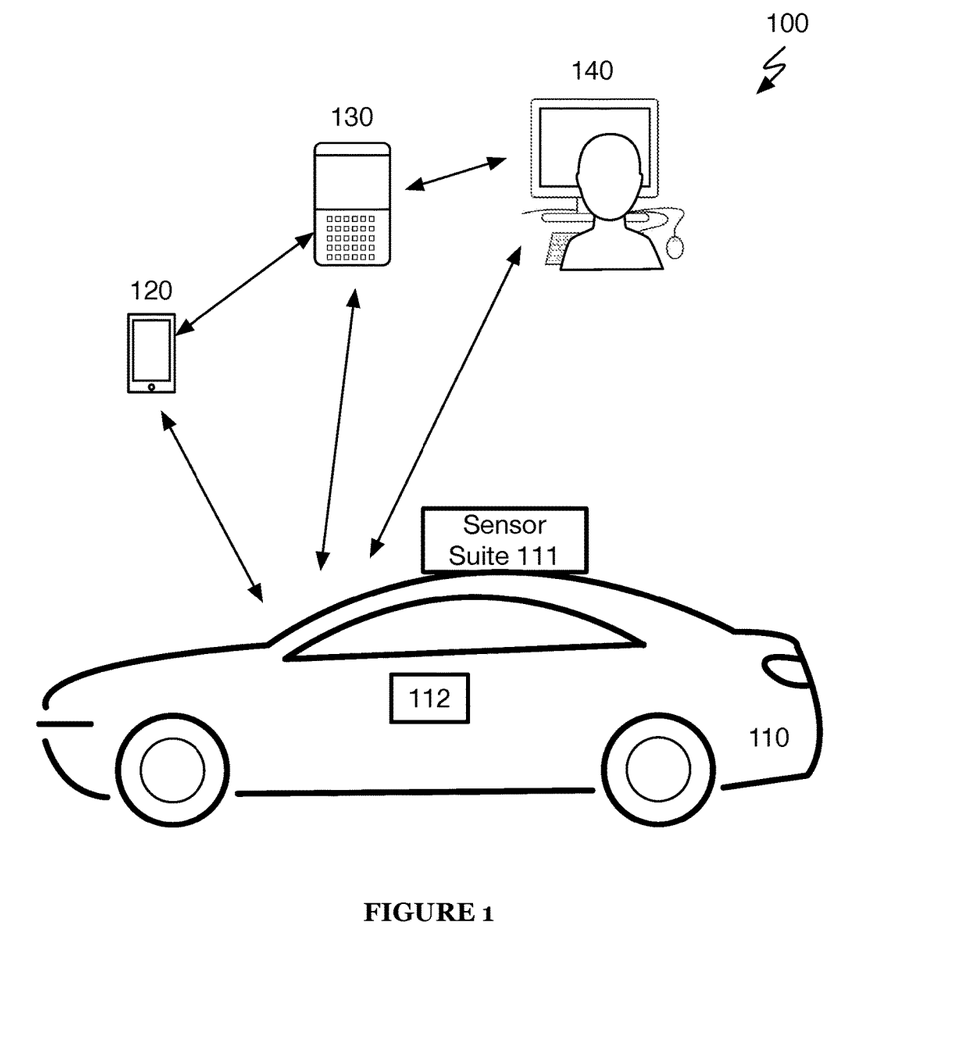
FIG. 1 is a diagram representation of a system of a preferred embodiment.

As shown in FIG. 1, a system 100 for intended passenger detection includes an autonomous vehicle 110 having a sensor suite 111. The system 100 may additionally include a user interface 120, a vehicle coordinator 130, and/or a remote expert interface 140.

The system 100 functions to enable autonomous vehicles 110 to locate and identify potential vehicle passengers using the advanced sensing and computational power of an autonomous vehicle platform. This power of the autonomous vehicle platform may be leveraged by using sensor data of a subject autonomous vehicle as well as other autonomous vehicles 110, data provided through user interfaces 120, data provided by a vehicle coordinator 130, and/or remote expert data provided through a remote expert interface 140, and/or other external data sources (e.g., traffic data streams, construction data streams, weather data streams, and the like).

The autonomous vehicle is preferably a fully autonomous automobile, but may additionally or alternatively be any semi-autonomous or fully autonomous vehicle; e.g., a boat, an unmanned aerial vehicle, a driverless car, etc.

In addition to a powertrain (or other movement-enabling mechanism), the autonomous vehicle preferably includes an onboard computer and a sensor suite 111 (e.g., computer vision system, LIDAR, RADAR, wheel speed sensors, GPS, cameras, etc.). The sensor suite 111 may additionally or alternatively include any sensors used by the autonomous vehicle 110 to perform driving and/or pickup functions as described in this specification. For instance, the sensor suite 111 may additionally include a gesture detection unit, a signal detection unit, a body frame detection and facial recognition unit, and the like. Each of these additional units of the sensor suite 111 may implemented using software and/or tailored computer instructions that are executed by a computing device (e.g., onboard computer) or one or more processors of the autonomous vehicle.

The gesture detection unit functions to detect and identify gestures performed by an entity, such as an intended passenger, that are directed toward the autonomous vehicle. The gesture detection unit may function based on an analysis of video captured by one or more cameras of the autonomous vehicle or based on identifying variations in captured light at one or more sensors of the gesture detection unit. In some embodiments, the gestures directed toward the autonomous vehicle are intended to indicate that the gesturing pedestrian or intended passenger is seeking or desires to be picked up, given a ride, or otherwise, seeking to make a ride request for themselves or another entity.

Accordingly, the gesture detection unit is capable of detecting gestures in one or more images, including still and video images, captured by one or more other sensors (e.g., cameras) of the sensor suite 111. For instance, while an autonomous vehicle is travelling or in a non-moving position (e.g., parked or stopped), the sensor suite of the autonomous vehicle may continually record and/or capture object and image information surrounding the autonomous vehicle. In real-time or near real-time (e.g., within moments or 1-5 seconds, etc.), the gesture detection unit may analyze the recordings and/or captured images to determine whether one or more gestures were or are being performed by a pedestrian or prospective passenger. In some instances, the gestures include body motions including waiving of hands, facial movements, a hand raise or foot raise, movement of a user interface device or computing device, and the like.

The gesture detection unit may preferably extract the identified gestures from the images or recordings or otherwise, focus or target its analysis on the prospective gesture. In gesture recognition analysis, the gesture detection unit may compare the identified or extracted gestures in the images or recordings to one or more predetermined gestures stored in a gesture database or the like. The predetermined gestures preferably relate to gestures, motions, or actions that may be performed by entities external to the autonomous vehicle for the purpose of signaling information or a request (e.g., a pickup request or ride request) to the autonomous vehicle. A subset of the predetermined gestures stored in the gesture database may include gestures specifically for signaling (e.g., hailing gestures) to the autonomous vehicle that a ride or pickup request is being made by the signaler. In the case that any of the identified or extracted gestures from the images matches or substantially matches one or more of the hailing gestures, the autonomous vehicle may immediately determine, using the onboard computer, that the signaler is requesting a pickup or a ride.

The signal detection unit functions to detect signals directed toward the autonomous vehicle that are produced and/or generated by a computing device or an electronic device of a pedestrian or intended passenger. The signals produced or generated by the computing device or the electronic device may be a visible (e.g., visible light) or invisible signal. For instance, the signal may be an invisible infrared or radio frequency signal. Additionally, or alternatively, the signal may be a visible signal including a light signal (e.g., strobing, continuous, or periodic light projection), a displayed graphic (e.g., an animated or still graphic), an acoustic signal (e.g., a periodic or continuous sound), and the like which is projected from or produced by the computing device or electronic device.

The produced or generated signal may be one of a group of signals recognizable by an autonomous vehicle that may be used to capture the attention of the autonomous vehicle for the purpose of obtaining a ride or a pickup. Thus, the produced or generated signals may be considered a ride request signal. Similar to the gesture detection unit, the signal detection unit may use images captured by the cameras to determine whether the signal is a ride request or hailing signal. However, the prospective ride request signal may be detected in any suitable manner, including but not limited to, using a radio frequency receiver, a sound receiver, and the like.

Once the signal detection unit identifies a prospective ride request signal, the autonomous vehicle may compare the signal to one or more predetermined signals in a signal database to determine whether the prospective ride request signal matches or substantially matches (e.g., 80-90% match or similarity) any of the one or more predetermined signals. If the prospective ride signal matches one or more of the predetermined signals, the autonomous vehicle, using the onboard computer, may immediately determine that the pedestrian or intended passenger is requesting a ride or a pickup.

In some embodiments, the signal produced by or generated by the pedestrian or intended passenger is a signal that was pre-negotiated between the intended passenger and the autonomous vehicle. For instance, when the intended passenger has submitted a ride request to a ridesharing platform or directly to the autonomous vehicle, immediately after or prior to the arrival of the autonomous vehicle to the intended passenger's location, the intended passenger and the autonomous vehicle may negotiate a signal (or image or displayable element) to enhance the autonomous vehicle's ability to locate and identify the intended passenger. Accordingly, if the intended passenger is in a crowd at his or her location, the signal can be projected to the autonomous vehicle to pinpoint or provide a higher precision in the location of the intended passenger.

The pre-negotiated signal may be selected from among a plurality of signals presented to the user, possibly via a display or other output device of the intended passenger's computing device or electronic device. Additionally, or alternatively, the intended passenger may be able to draw an image that is communicated to the autonomous vehicle and displayed via the intended passenger's mobile computing device. In such case, the autonomous vehicle would seek to locate and/or identify the intended passenger based on identifying the drawing with one or more of the sensors of the autonomous vehicle. The autonomous vehicle may also include a signal generator or signal generating unit, implemented by one or more processors or the onboard computer. The signal generator of the autonomous vehicle may be able to generate a random, unique signal and transmit that signal to the electronic device or computing device of the intended passenger prior to the autonomous vehicle's arrival or even upon arrival of the autonomous vehicle at the location or vicinity of the intended passenger. The random signal may then be used by the intended passenger to specifically identify himself/herself as well as precisely locate himself/ herself to the autonomous vehicle. Thus, the random signal may serve dual purposes including precisely locating the intended passenger and also, for authorizing the intended passenger for pickup.

The body frame detection and facial recognition (BFR) unit functions to identify and/or detect an intended passenger based on a body position and/or facial expression of the intended passenger. The BFR unit functions to detect a silhouette or similar body position or frame of a pedestrian or other individual external to the autonomous vehicle for the purposes of determining whether the pedestrian is an intended passenger. The BFR unit may be able to use any sensor available in the sensor suite 111 to perform the detection. The body frame analysis may involve targeting or extracting individual body frames (or multiple body frames) from the sensor data in order to compare the targeted body frames to predetermined body frames or silhouettes in a body frame database. Upon detecting a match or a substantial match, the autonomous vehicle may be able to determine that an intended passenger requires a ride or is attempting to make a ride request.

In some instances, if the intended passenger has made an express request for a ride or pickup (e.g., using a ridesharing platform or the like), the rider may provide a current (e.g., real-time or near real-time) body frame of himself/herself either by taking a picture or otherwise, authorizing the autonomous vehicle to use a body frame of the intended passenger that is on file or accessible to the autonomous vehicle. In such instance, the autonomous vehicle would specifically search for the specific body frame provided by the user when the autonomous vehicle is within a vicinity (e.g., a detectable range) of the intended passenger.

The facial recognition component of the BFR unit may be used in a similar manner to detect an intended passenger based on a facial image or facial expression of the intended passenger. The intended passenger, in such embodiment, may capture a real-time or near real-time image of their face that can be used by the BFR unit of the autonomous vehicle. Similar to the body frame detection and corresponding analysis, the detected facial image or expression of an intended passenger may be compared to pre-stored facial images that may normally indicate that a pickup or a ride is being requested. A match or substantial match would trigger the autonomous vehicle to make a pickup or offer a pickup request to the intended passenger.

The onboard computer functions to control the autonomous vehicle and processes sensed data from the sensor suite 111 and/or other sensors in order to determine the state of the autonomous vehicle. Based upon the vehicle state and programmed instructions, the onboard computer preferably modifies or controls behavior of the autonomous vehicle.

The onboard computer is preferably a general-purpose computer adapted for I/O communication with vehicle control systems and sensor systems (e.g., sensor suite 111), but may additionally or alternatively be any suitable computing device. As mentioned above, the onboard computer may additionally include a signal generating unit or include signal generating capabilities, such that a random or unique signal may be generated for an intended passenger of an autonomous vehicle. The signal generating unit may include a random number generator to generate random numbers that can then be converted into a unique signal. Additionally, the signal generator may have access to a database including a large number of signals or random signals that can be selected by the autonomous vehicle and transmitted to the user. The onboard computer is preferably connected to the Internet via a wireless connection (e.g., via a cellular data connection). Additionally or alternatively, the onboard computer may be coupled to any number of wireless or wired communication systems, including other autonomous vehicles or devices thereby forming a mesh communication network or the like.

The autonomous vehicle 110 may additionally or alternatively include an external input interface 112 that functions to enable a person or another entity exterior to the autonomous vehicle to communicate or interact with the vehicle. The external input interface 112 preferably includes one or more input devices located at or otherwise coupled to the exterior of the vehicle, but may additionally or alternatively include any input devices accessible to a person outside of the vehicle (e.g., a camera located inside a vehicle cabin, but imaging the outside of the vehicle through a window).

The external input interface 112 may be used by an intended passenger or pedestrian to communicate information relating to a pickup request or a ride request. For instance, when the autonomous vehicle is in a parked or non-moving state, a pedestrian or intended passenger may approach the autonomous vehicle and using the external input interface 112 input data for submitting or generating a pickup or ride request with the autonomous vehicle. In response, the autonomous vehicle would process the information submitted via the external input interface 112 and determine whether it is available to fulfill the request or otherwise, re-route the request to another autonomous vehicle.

Additionally, the external input interface 112 may also function as an interface for authorizing or authenticating an intended passenger. Prior to providing access to an intended passenger, who at a prior time submitted a pickup or ride request, the autonomous vehicle may require that the intended passenger verify or otherwise, confirm that the autonomous vehicle has identified the correct intended pedestrian for pickup. In this way, the intended passenger can use the external input interface 112 to confirm his or her name and/or provide information to the autonomous vehicle that confirms the intended passenger's identity or confirms that the intended passenger originated or submitted the pickup or ride request. The confirmation can be performed in a number of manners including using biometric authentication, providing a challenge and successfully responding to the challenge, interface a computing device of the intended passenger with the external input interface 112, and basically, using any suitable manner for identifying or confirming the intended passenger.

Additionally, or alternatively, the external input interface 112 may function as a means for providing an indication to an intended passenger. The external input interface 112 may include a display screen and the autonomous vehicle may be able to display the indication via the display screen. The indication may be a symbol, a graphic, a color, a character, an animated graphic, a character combination, number combination, the intended passenger's name, any combination of the foregoing and the like that may be used to specifically identify the autonomous vehicle that is scheduled to pick up an intended passenger who made a ride or pickup request. The indication provided by the autonomous vehicle may simultaneously be presented via an electronic device or mobile computing device of the intended passenger. Thus, the intended passenger and the autonomous vehicle may be coordinated to present the same indication (e.g., an external display of the AV and a display of the intended passenger's computing device displays the same image or indication) so that the intended passenger is able to identify the autonomous vehicle that is scheduled to perform the pickup by simply referring to his/her device and viewing the indication thereon and matching the viewed indication to the indication being presented by the autonomous vehicle.

The indication may be selected or originated by either the autonomous vehicle or the intended passenger. That is, either of the autonomous vehicle or the intended passenger may determine or select the indication to be used in coordinating an enhanced or speedy pickup. For example, prior to the or upon arrival of the autonomous vehicle, the intended passenger may select (or draw) an image as an indication for coordinating pickup. Alternatively, the intended passenger may capture an image with a computing device that can be used as a coordinating indication for picking up the intended passenger. On the other hand, the autonomous vehicle may randomly generate or select the image that will be used for coordinating the pickup of the intended passenger.

The external input interface 112 is preferably substantially similar to the interface described in U.S. Provisional Patent Application No. 62/274,586, filed on 4 Jan. 2016, the entirety of which is incorporated by this reference. Additionally or alternatively, the external input interface 112 may be any suitable interface.

Processing required to perform duties of the system 100 may be performed using dedicated processors (i.e., processors dedicated to and included in the system 100), any processors of the autonomous vehicle 110 (e.g., the onboard computer, microcontrollers, graphics processors, cryptographic processors, etc.), and/or any other processors (e.g., remote server processors). Likewise, any other resources required for system 100 duties may be provided by dedicated resources (e.g., a battery dedicated to the system 100) and/or by resources of the autonomous vehicle 110 (e.g., a primary battery of the autonomous vehicle).

The user interface 120 enables an autonomous vehicle user (e.g., a potential passenger, or a ridesharing platform user who may not be a passenger) to interact with and provide information to an autonomous vehicle (e.g., information about a passenger for whom a pickup is requested). The user interface 120 is preferably a web interface or a native application interface accessible through a mobile electronic device (e.g., a smartphone, a laptop computer, etc.) but may additionally or alternatively be any interface through which a user may communicate with an autonomous vehicle no or a system that affects control of an autonomous vehicle no (e.g., the vehicle coordinator 130). For example, a user interface 120 may be a touchscreen in an autonomous vehicle 110. The user interface 120 is preferably any interface capable of providing passenger data as described in the section on the method 200. Additionally, or alternatively, the user interface 120 may be any interface capable of influencing autonomous vehicle operation.

Accordingly, the user interface 120 may be used by the autonomous vehicle user or intended passenger to perform one or more signals for requesting a ride or a pickup by an autonomous vehicle, selecting or identifying a shared indicator to be used in facilitating a pickup by the autonomous vehicle, and the like.

The vehicle coordinator 130 functions to provide passenger pickup related data and/or decision assistance to the autonomous vehicle no. The vehicle coordinator 130 may transmit data to the autonomous vehicle no using external sources (e.g., a user, through the user interface 120) and/or from internal sources (e.g., map data of an autonomous vehicle platform). Additionally or alternatively, the vehicle coordinator 130 may be used to provide data analysis for passenger pickup (e.g., locating a potential passenger). For instance, the vehicle coordinator 130 may be able to leverage greater computational resources and/or human experts to parse out communication signals from intended passengers, to perform more computationally intensive facial recognition protocols in the case that the autonomous vehicle must identify a single intended passenger among a great number of potential passengers, and the like. Additionally, the vehicle routing coordinator 130, using ridership data of the autonomous vehicle platform and the like, may function to project demand data for autonomous vehicles that will be required in specific geographic areas. Based on the projected demand, the vehicle coordinator 130 may generate pickup or ride requests that are provided to the one or more autonomous vehicles in a fleet to ensure that an optimal number of autonomous vehicles are available to satisfy ride requests in the identified geographic areas.

The vehicle coordinator 130 may also function to perform any data routing to and/or from autonomous vehicles no as well as any data processing as described in the sections on the method 200 or above with respect to the functionality of the sensor suite 111 and the associated operational units (e.g., gesture recognition unit, etc.). Data received by the vehicle coordinator 130 may potentially traverse multiple network hops before being received; e.g., autonomous vehicle sensor data may be sent from a first vehicle to a second vehicle, from the second vehicle to a third vehicle, and from a third vehicle to an internet-enabled base station, before finally being communicated to the vehicle coordinator 130 via the Internet or another long-range communication scheme or means.

The remote expert interface 140 functions to provide information to and/or from a remote expert, as described in U.S. Provisional Patent Application No. 62/274,577, filed on 4 Jan. 2016, the entirety of which is incorporated by this reference. The remote expert may, for example, use video data of the sensor suite 111 to identify a potential passenger for a passenger pickup.

2. Method for Intended Passenger Detection

Figure 2:
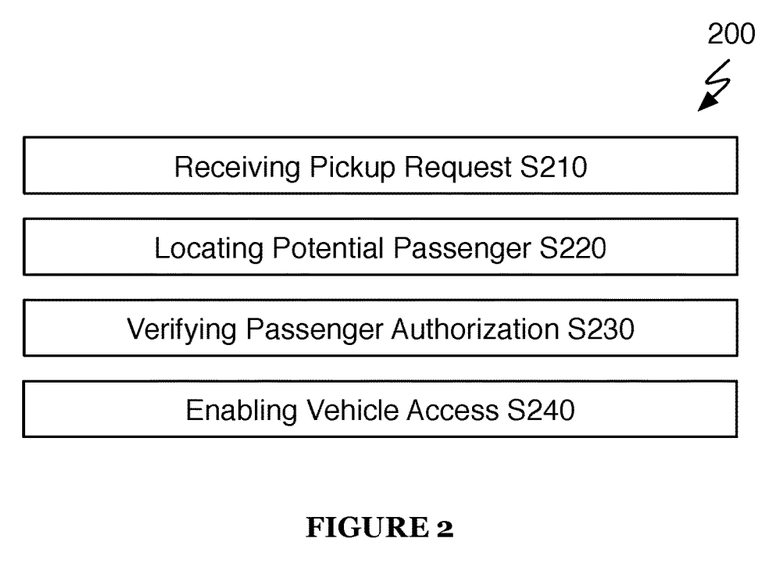
FIG. 2 is a chart representation of a method of a preferred embodiment.

As shown in FIG. 2, a method 200 for intended passenger detection includes receiving a pickup request for a potential passenger S210, locating the potential passenger S220, verifying passenger authorization S230, and enabling vehicle access S240.

Traditional ridesharing platforms are configured to receive pickup requests from GPS-enabled smartphones. Account information stored in the smartphone allows access to user information (including payment methods) and the phone's location at time of request (or a manually specified location entered by a user) are used to locate a ride's requestor. The limited nature of how users are identified and located leads to a less-than-satisfactory user experience; for example, when one person wishes to request a ride for another, the second person is 'tied' to or otherwise, strictly associated with the smartphone of the first person. Further, the technology used to locate users often results in frustration; GPS is usually the sole technology used in locating users and because GPS is often not incredibly accurate in cities (and people tend to move while waiting for pickup), it can be difficult for ridesharing vehicles to locate intended passengers.

The method 200 functions to surmount these difficulties by utilizing the advanced sensing and computational power of autonomous vehicle platforms to locate and identify potential passengers with both higher accuracy and higher flexibility than traditional solutions. Specifically, using a combination of the enhanced computational capabilities of the autonomous vehicle, advanced sensing capabilities of the autonomous vehicle, as well as novel locating and identification techniques and schemes, the autonomous vehicle can locate and identify an intended passenger in less time to thereby improve operational efficiencies (e.g., less fuel or energy usage, less wear-and-tear, etc.) of the autonomous vehicle and enhance the intended passengers ride experience.

The method 200 is preferably implemented by the system 100, but may additionally or alternatively be implemented natively by any system comprising an autonomous or semi-autonomous vehicle.

S210 includes receiving a pickup request for a potential passenger. Additionally, or alternatively, S210 may include identifying a pickup request for a potential passenger. The pickup request or ride request of S210 functions to alert an autonomous vehicle that a passenger desires pickup by the autonomous vehicle.

S210 preferably includes receiving an electronic pickup request from an autonomous vehicle platform (e.g., a ridesharing platform), but may additionally or alternatively include receiving or otherwise inferring any pickup request based on circumstances surrounding the autonomous vehicle. For example, S210 may include receiving a pickup request transmitted directly from a user's smartphone, receiving a pickup request initiated by a person touching an external interface on the side of the autonomous vehicle while parked, and/or inferring a pickup request from a person's behavior (e.g., a person on a sidewalk making a hailing motion with their arm). A pickup request may be achieved using a combination of these methods or any suitable method for acquiring an attention of the autonomous vehicle and further, communicating the desire for pickup by the intended passenger.

S210 may include inferring pickup requests in any manner. For example, S210 may infer pickup requests from audio data (e.g., a person whistling or yelling for a vehicle), video data (e.g., a person waving or otherwise raising his/her arm), historical data (e.g., a person's pickup request history, aggregated pickup request history for an area), or any other source. The audio data may additionally include sounds produced or generated by a computing device, such as a smart phone, of the intended passenger. In some embodiments, the computing device of the intended passenger may be able to produce audible and/or subsonic sounds detectable by the autonomous vehicle and once detected by the autonomous vehicle, would alert to the autonomous vehicle that the intended passenger associated with the computing device desires a pickup.

In one example embodiment, S210 includes inferring or receiving a pickup request by using video data to parse light emitted from a person's smartphone (or other active signaling from a mobile electronic device). For example, the flash on such a device could be strobed to signify pickup request (further, such a strobe could include additional pickup request information). Additionally, or alternatively, a display screen of the mobile electronic device may similarly be strobed, flashed, or a computer detectable image presented to communicate a pickup or ride request to an autonomous vehicle. Once the autonomous vehicle parses the light or image data projected from the mobile electronic device, the light or image data may be compared to or matched against light or image signals of a signaling database accessible to the autonomous vehicle. Each of the light or image signals within the signaling database corresponds to or is otherwise, linked to predetermined communication or ride request data which identify one or more attributes or characteristics of a pickup or ride request communicated by the signal. For instance, an attribute or characteristic of a ride request may include a proposed destination or distance of travel, a number of proposed passengers, an urgency of the ride request, and the like. If the autonomous vehicle identifies a match or a substantial match between the light or image data and a light or image signal stored in the signaling database, the autonomous vehicle proceeds to interpret the light or image data communication and determine whether the passenger is requesting a pickup and one or more details of the pickup request.

In a second example embodiment, S210 includes receiving a pickup request from a user proposing the pickup of a third party, which third party receives a code, link, set of instructions, and/or any other suitable prompt to follow or have executed that notifies the autonomous vehicle of the desire to be picked up (e.g., by opening the link and pointing the opened webpage toward the street).

The pickup request received in S210 may include request data; i.e., data related to the pickup request. For example, pickup request data may include data about the requestor's location, a specified pickup location, the type of vehicle requested, information about for whom the request is intended (which may include people other than the requestor), payment information, user account information, preferred driving characteristics, preferred routing options, or any other suitable information related to the pickup request.

S210 may additionally or alternatively include inferring pickup request data (e.g., contextual data). For example, S210 may include inferring that a person hailing a ridesharing vehicle carrying a suitcase may want access to the trunk of the vehicle (or that the person might be going to the airport). As another example, S210 may include interpreting pickup request data from a user's gesture (e.g., holding up two fingers may mean that a user needs two seats in a ridesharing vehicle). The user's gestures may be performed solely based on movements of body parts of the user or based on a combination of movements of the user's body parts and a movement of an electronic device of the user. Thus, an autonomous vehicle may be able to track both the movement of the body part, as well as the movement of the electronic device. In such instances, S210 may involve tracking the combination movement using two or more detection methods, which may involve using a gesture detection unit and possibly an electronic device detecting component. The electronic device detecting component may be able to detect a movement of the electronic device (e.g., a smart phone, a wearable computing device) based on readings of signals from the gyrometer, inclinometer, and/or accelerometer of the electronic device. S210 may include inferring pickup request data from any data source; e.g., a platform user's request or feedback history, sensor data of an autonomous vehicle, demographic data of a platform user.

Additionally, or alternatively, S210 may function to infer a pickup request based on identifying a posture or body position of a person. Specifically, using one or more sensors (e.g., cameras, radar, etc.) of an autonomous vehicle a two-dimensional and/or three-dimensional body position of a person may be identified. At S210, if it is determined that a body position of the person matches a predetermined body position indicative of a person desiring pickup or a ride, the autonomous vehicle would maneuver in order to determine whether the associated person is, in fact, in need of pickup. The person can confirm the potential pickup request expressly or impliedly, by action, responding to the autonomous vehicle.

S210 may additionally or alternatively include prompting an intended passenger for pickup request data; for example, if a person desiring pickup alerts an autonomous vehicle of such desire using an interface on the vehicle (e.g., while the vehicle is parked), that interface (e.g., a touchscreen) may prompt the person to input identity or other information relevant to autonomous vehicle platform use (e.g., a login, a destination, a fingerprint).

Pickup requests received in S210 may have varying levels of specificity. For example, a more general pickup request might be initiated from a ridesharing platform and may simply direct a vehicle to locate and pickup any person requesting a ride (e.g., by hailing the vehicle) in a particular area. Additionally, the ridesharing platform may instruct the autonomous vehicle to park at a specific location and wait for any person to make a request for pickup or a ride, possibly using an external interface of the autonomous vehicle or the like. As an example of a more specific pickup request, a pickup request may specify that an autonomous vehicle locate and pick up a specific person.

S220 includes locating the potential passenger. S220 functions to locate one or more persons specified in a pickup request of S220. Additionally, or alternatively, S220 functions to locate a person making an inferred pickup request.

S220 preferably includes explicitly localizing a potential passenger to a specific location or small area, but may additionally or alternatively includes localizing a potential passenger to any area, volume, or space. For example, in scenarios where pickup requests are inferred or otherwise communicated from a local source (e.g., a person hailing a ridesharing vehicle as imaged by a camera of the vehicle), S220 may include inferring that the potential passenger is 'close enough' simply by virtue of being within sensor range of the sensor that identified the pickup request. Additionally, in circumstances in which the pickup request includes an initial location area of the intended passenger having a first area size, localizing the location of the intended passenger involves diminishing or reducing the first area size to a second, third, or subsequent area size that is smaller than the initial location area size and becomes smaller with each iteration. Specifically, based on acquiring additional data points relating to a location of the intended passenger, the autonomous vehicle may be able to identify with higher precision a specific location/area or position of an intended passenger. For example, an autonomous vehicle may receive a pickup request which includes a general location of an intended passenger (e.g., address location) and the autonomous vehicle may additionally receive video data from the intended passenger relating to the circumstances around the intended passenger's location. From the video data the autonomous vehicle may be able to specifically identify objects that are in close proximity to the intended passenger that can be used by the autonomous vehicle to reduce the general location area (e.g., address location) of the intended user to a specific location area (e.g., standing position of the intended passenger), such as by identifying that the user is at a specific address location and next to a sign that reads "Restaurant" and a blue fire hydrant. These two additional objects identified in the video data provide two additional data points to refine the actual location area of the intended passenger. Thus, while attempting to locate the intended passenger, the autonomous vehicle can use, at least, three data points including the general location provided with the pickup request, the restaurant sign, and blue fire hydrant to localize the intended passenger by interpolating a potential position of the intended passenger with respect to each of the three data points. While traveling towards the intended passenger, the autonomous vehicle may be able to use its sensor suite to actively interpolate a refined location of the intended passenger by using the general location area in conjunction with identifying each of the restaurant sign and the blue fire hydrant.

S220 preferably includes locating the potential passenger using one or more of passenger location data, passenger identity data, vehicle map data, and autonomous vehicle sensor data, but may additionally or alternatively include locating the potential passenger using any suitable data.

Passenger location data preferably includes data that may be used to describe the location of the potential passenger. This data is preferably transmitted to the autonomous vehicle by a platform user, but may additionally or alternatively be accessible to the autonomous vehicle by any method. Passenger location data may include, for example, GPS coordinates describing a passenger's location, an address near a passenger's location, and/or landmarks or other points of interest near a passenger's location. Passenger location data may additionally or alternatively include image, video, and/or audio data taken of a location (e.g., a picture taken by a passenger of the passenger's surroundings), which may be analyzed and compared to a 3D map, autonomous vehicle sensor data, or any other data (e.g., analysis of the image may produce a name of a store, which is searched for in a database to come up with a location).

In one example embodiment, S220 functions to provide augmented reality capabilities to a user device (e.g., a mobile computing device or the like) that allows an intended passenger to livestream their environment with a computer-generated overlay over a display of the livestreamed environment. The overlay, in some embodiments, may provide display and/or provide information from the autonomous vehicle's perspective. That is, the overlay would demonstrate a manner in which the autonomous vehicle would interpret the livestreamed environment surrounding the intended passenger including the identifiable objects and traffic elements (e.g., lanes, traffic lights, curbs, bus lanes) in the environment, the location, and the like. For instance, if in the livestream environment, an available open space at a curb is a best position for the autonomous vehicle to stop and pick up the intended passenger, the overlay may show this position as green area together with an indication of optimal pick up location thereby suggesting to the intended passenger to re-position to the optimal location for pickup. Alternatively, any location in the livestream which includes a bus lane, an obstruction (e.g., another vehicle, an object, etc.) blocking a curb or potential pickup position, the augmented reality overlay would illustrate those positions as red indicating suboptimal or unavailable locations for pickup.

The augmented reality overlay of S220 may additionally indicate one or more movements that the intended passenger can make to better position himself/herself for pickup by creating a marker, such as a pinpoint, and/or providing arrows or other instructional indicators that direct the intended passenger to one or more better locations for pickup by the autonomous vehicle.

Additionally, or alternatively, the livestream and augmented reality overlay of the intended passenger's mobile computing device may be communicated or shared with the autonomous vehicle. The autonomous vehicle may be able to compare the augmented reality (AR) and livestream mapping of the mobile computing device of the intended passenger to its own mapping (e.g., three-dimensional map) to determine a more specific location of the intended passenger having more detail than a simple GPS pinpoint on a map. Thus, based on finding overlaps between the AR livestream mapping and the mapping of the autonomous vehicle, the autonomous vehicle may better localize the location of the intended passenger.

Passenger identity data preferably includes data that may be used to identify a passenger; for example, a picture of the passenger, demographic data describing the passenger, physical data describing the passenger, a model of the passenger's body, a description of the passenger's clothing, a voice model of the passenger's voice, a code known to the passenger, an electronic signature of a device or application possessed by the passenger, and/or a gesture known to the passenger.

Vehicle map data preferably includes data (accessible to the autonomous vehicle) that associates image and/or audio data with location (e.g., a 3D map of an area). Vehicle map data may additionally or alternatively include any data that links data capable of being sensed by an autonomous vehicle to a location (e.g., coordinates).

Autonomous vehicle sensor data preferably includes data sensed by the autonomous vehicle, such as image data, video data, audio data, accelerometer data, temperature data, or any other data. Autonomous vehicle sensor data may, for instance, be compared with passenger location data to aid in locating a passenger.

S220 may include using suitable data to locate the potential passenger in any manner. In a first example, S220 includes using GPS and/or address data provided as part of a user pickup request to navigate to an area (e.g., specified by a known or estimated degree of uncertainty in GPS receiver readings—this may include uncertainty in vehicle GPS and/or uncertainty in potential passenger GPS receiver readings), and then using face recognition technology to identify and locate the potential passenger (comparing imaged faces to a known face image or parametric description of the potential passenger). Alternatively, LIDAR data may be used to measure the height of potential passengers and identify the potential passenger by comparing such data to known height information or a model of the potential passengers.

In a second example, S220 includes receiving image data from a potential passenger's mobile electronic device and comparing that image data to map data and/or autonomous vehicle sensor data to determine a location of the passenger (either absolutely, using map data, or relative to the autonomous vehicle). S220 may include determining the location of the potential passenger from this data in any manner; for example, by attempting to calculate an image transformation between image data of the potential passenger and of the autonomous vehicle. As another example, S220 may include performing feature recognition and/or edge detection on potential passenger image data (or otherwise parameterizing the data) and comparing the parameterized data to stored map data (e.g., present in an autonomous vehicle platform or in an autonomous vehicle's internal storage).

Figure 3:
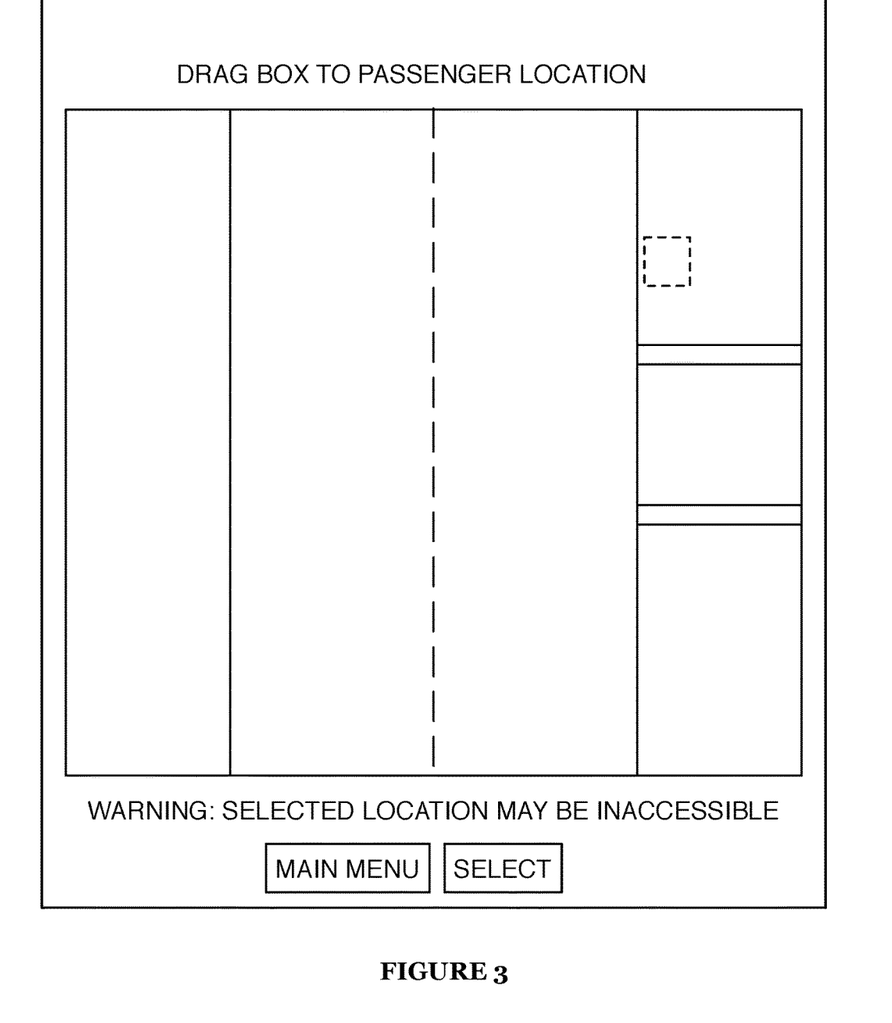
FIG. 3 is an example view of a user interface passenger localization of a method of a preferred embodiment.

In a third example, a potential passenger is asked to select or otherwise indicate their location using map data presented to the potential passenger. For example, the potential passenger may be shown an interface as shown in FIG. 3 that asks the potential passenger to select their location using a top-down map (or satellite, etc.) view. Potential passengers may additionally or alternatively be asked to identify an area for autonomous vehicle to pick up a passenger (e.g., a section where an autonomous vehicle may pull to a curb).

If a passenger is detected using sensor data of an autonomous vehicle, that data may be analyzed in any manner by the autonomous vehicle and/or by any other source of analysis. For example, autonomous vehicle sensor data may be analyzed (e.g., using feature detection and a Kalman filter) by a computer or distributed computing system to first determine a 'pickup desire' score for persons (i.e., some description of the likelihood that a person is attempting to be picked up by a vehicle) and then attempting to identify the potential passenger from persons with an above-threshold pickup desire score. The pickup desire score may be determined in any manner; for example, by a person's motion (e.g., if they appear to be moving toward the vehicle, if they are gesturing), a person's position (e.g., they are standing in the street or close to a curb) and/or any other suitable data (e.g., if a person is holding a bike, they may have a lower pickup desire score). As another example, autonomous vehicle sensor data may be analyzed by a person; for example, the potential passenger may identify him or herself in image data captured by the autonomous vehicle and transmitted to the potential passenger. Alternatively, the autonomous vehicle sensor data may be analyzed by a remote expert, as described in U.S. Provisional Patent Application No. 62/274,577, filed on 4 Jan. 2016, the entirety of which is incorporated by this reference. The remote expert may, for example, use video data to identify the potential passenger.

In a further example, S220 may function to provide the intended passenger instructions for performing an autonomous vehicle-determined movement or signal that may involve specific gestures and/or movements to be performed using an electronic device of the intended passenger. The autonomous vehicle-determined movement or signal may require that the intended passenger perform the movement or signal in a specified manner. The instructions to the intended passenger may present a video, still image, or audio communication of the movement or signal so that the intended passenger can easily imitate or replicate the movement toward the autonomous vehicle. The autonomous vehicle-determined movement or signal may be a unique passenger locating and/or passenger identification scheme that when detected by the autonomous vehicle allows for an immediate detection and location of the intended passenger.

Preferably, the determined movement or signal is unique to the specific ride request and shared only with the intended passenger.

Additionally, or alternatively, S220 functions to augment the autonomous vehicles pickup request data with data from other vehicles or autonomous vehicles which may pass by an intended passenger of a pickup request prior to the arrival of the subject autonomous vehicle that is scheduled to pick up the intended passenger. For instance, while the autonomous vehicle is traveling to an indicated location of a pickup request, other vehicles including autonomous vehicles passing by the intended passenger may collect location data of the intended passenger as they travel by the intended passenger and transmit that the location data to the autonomous vehicle scheduled to pick up the intended passenger. The aggregate of the location data (e.g., additional location data points) of the intended passenger provided by the other vehicles may be used by the autonomous vehicle to refine or further localize a specific location of the intended passenger.

Accordingly, once an intended passenger or person desiring a pickup is identified and/or located according to one or more of the schemes or method described in S220, an onboard computer of the autonomous vehicle or vehicle routing coordinator may use the obtain identification and location information to generate routing instructions and autonomous vehicle control instructions for the autonomous vehicle to allow the autonomous vehicle to successfully maneuver to the enhanced location of the identified intended passenger or person. The generated autonomous vehicle controls may be determined by identifying a route for the autonomous vehicle that best tracks a reverse trajectory of signal or the like from the intended passenger.

S230 includes verifying passenger authorization. S230 functions to verify an authorization level of the potential passenger to access the autonomous vehicle. If passenger identity information is included in the pickup request data, S230 may include checking authorization using the passenger identity information (e.g., verifying that a passenger is associated with an active payment method). S230 may additionally or alternatively include verifying passenger authorization in any manner (e.g., via a passenger swiping a credit card or ID card on an external card reader interface of the autonomous vehicle). As another example, S230 may include showing image data of a potential passenger to a remote expert, who may or may not authorize access to the vehicle.

Note that passenger authorization may be constrained, for example, passengers may have access to only certain parts or functions of the autonomous vehicles (e.g., some passengers may not be able to access the trunk of the vehicle, other passengers may be only able to direct the vehicle to travel within a certain specified geographic area, etc.).

S240 includes enabling vehicle access. S240 functions to allow the potential passenger and/or other individuals to access the vehicle. If vehicle access constraints are tied to passenger identity (that is, the constraints are in some way tied to passenger identity), S240 preferably includes enabling vehicle access according to those identity-dependent constraints. Additionally or alternatively, S240 may include enabling access to the autonomous vehicle subject to any other constraints (or no constraints).

S240 preferably includes enabling vehicle access after successful passenger authorization in S230, but may additionally or alternatively enable vehicle access based on any other condition. Likewise, S240 may include denying vehicle access after failed passenger authorization in S230 (e.g., denying access to open a door, preventing movement of the vehicle if someone unauthorized is in the vehicle).

In one implementation of a preferred embodiment, S240 includes modifying vehicle behavior to enable vehicle access. For example, S240 may include moving the autonomous vehicle toward a potential passenger (or pickup location) to make it easier for a potential passenger to access the vehicle. Behavior modification may be dependent on data collected or inferred in other steps of the method 200; for example, a vehicle may briefly stop in the street to pick up a passenger identified as carrying no bags, while a vehicle may choose to park to pick up a passenger carrying multiple bags (even if the parked location is further from the passenger). As another example, an autonomous vehicle may generally attempt to avoid pedestrians, but that behavior may be modified if a pedestrian is identified as the potential passenger. As a third example, an autonomous vehicle may automatically open a trunk (or other storage space) if a potential passenger may have need of it (e.g., if they are carrying a bag, if they are picking up a package from the autonomous vehicle).

S240 may additionally or alternatively include modifying autonomous vehicle behavior protocols in any manner in response to passenger detection, location, and/or authorization.

The method of the preferred embodiment and variations thereof can be embodied and/or implemented at least in part as a machine configured to receive a computer-readable medium storing computer-readable instructions. The instructions are preferably executed by computer-executable components preferably integrated with an autonomous vehicle platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for use by an autonomous vehicle to locate an intended passenger, the system comprising:
  a mobile computing device of the intended passenger configured to selectively generate light signals;
  a vehicle routing coordinator configured to, by a processor, infer a pickup request based on an analysis of the light signals and provide the inferred pickup request to the autonomous vehicle;
  the autonomous vehicle comprising a sensor suite for sensing circumstances surrounding the autonomous vehicle, the autonomous vehicle being configured to locate and identify the intended passenger desiring to be picked up based on the inferred pickup request.

2. The system of claim 1, wherein the inferring the pickup request includes using the sensor suite of the autonomous vehicle to identify one or more behaviors of the intended passenger indicating the desire to be picked up the autonomous vehicle.

3. The system of claim 2, wherein the identifying the one or more behaviors includes identifying a signaling of position by the mobile computing device; tracking movement of the mobile computing device, and interpreting the tracked movements of the mobile computing device as a desire of the intended passenger to be picked up by the autonomous vehicle.

4. A method for locating and/or identifying a potential passenger for pickup by an autonomous vehicle, the method comprising:
receiving a pickup request for the potential passenger, the pickup request comprising a geographic location for locating and picking up the potential passenger by the autonomous vehicle, the received pickup request comprising inferring the pickup request by the autonomous vehicle, wherein inferring the pickup request comprises interpreting at least one of light signals from and movement of a mobile computing device of the potential passenger as a desire of the potential passenger to be picked up by the autonomous vehicle;
locating the potential passenger based on the geographic location and using data from one or more sensors of the autonomous vehicle; and
in response to locating the potential passenger, controlling the autonomous vehicle to a position to enable pickup of the potential passenger.

5. The method of claim 4, wherein the inference by the autonomous vehicle is based on identifying one or more behaviors of the potential passenger, wherein the identified one or more behaviors of the potential passenger includes a performance of one or more signals by the potential passenger that are directed toward the autonomous vehicle, wherein when the autonomous vehicle determines that the one or more signals match one or more predetermined ride requesting signals, the autonomous vehicle infers that the potential passenger desires to be picked up by the autonomous vehicle.

6. The method of claim 4, wherein locating the potential passenger includes:
receiving image data from a computing device of the potential passenger, wherein the image data comprises images or video of circumstances surrounding the potential passenger;
comparing the image data to predetermined map data or sensor data of the autonomous vehicle; and
determining the location of the potential passenger based on the comparison.

7. The method of claim 6, wherein the determining the location is performed by one or more of:
(i) calculating an image transformation between the image data from the potential passenger and real-time image data sensed by the autonomous vehicle; and
(ii) performing feature recognition and/or edge detection on the image data and matching resulting parameterized data from the feature recognition and/or edge detection to a predetermined map accessible to the autonomous vehicle.

8. The method of claim 4, wherein locating the potential passenger includes receiving a selection or indication by the potential passenger of a location using map data presented to the potential passenger.

9. The method of claim 4, wherein inferring the pickup request further comprises:
identifying a body posture of the potential passenger; and
interpreting the body posture of the potential passenger as a desire of the potential passenger to be picked up by the autonomous vehicle.

10. The method of claim 4, wherein inferring the pickup request further comprises:
capturing a facial image or video of the potential passenger; and
interpreting the facial image of the potential passenger as a desire of the potential passenger to be picked up by the autonomous vehicle.

11. The method of claim 4, wherein inferring the pickup request further comprises:
tracking a movement of a mobile computing device of the potential passenger;
generating the position signals based on the tracked movement; and
interpreting the tracked movements of the mobile computing device as a desire of the potential passenger to be picked up by the autonomous vehicle.

12. The method of claim 4, wherein receiving the pickup request comprises:
receiving, via an external input interface of the autonomous vehicle, input from the potential passenger indicating that a pickup by the autonomous vehicle is desired.

13. A method for locating and/or identifying a potential passenger for pickup by an autonomous vehicle, the method comprising:
receiving a pickup request for a potential passenger, the pickup request comprising a geographic location for locating and picking up the potential passenger by the autonomous vehicle;
locating the potential passenger based on the geographic location and using data from one or more sensors of the autonomous vehicle; and
in response to locating the potential passenger, controlling the autonomous vehicle to a position to enable pickup of the potential passenger;
wherein the locating the potential passenger includes:
receiving a livestream from a mobile computing device of the potential passenger, wherein the livestream includes an augmented reality overlay, wherein the augmented reality overlay generates data and/or objects overlaid the livestream that demonstrates the autonomous vehicle's interpretation of the circumstances in the livestream; and
using, by the autonomous vehicle, data of the livestream and augmented reality overlay to determine the location of the intended passenger.

14. The method of claim 13, wherein the autonomous vehicle uses the data of the livestream and augmented reality overlay to instruct the potential passenger of a modified location for pickup.

\* \* \* \* \*